United States Patent [19]

Mitake

[11] Patent Number: 5,351,904
[45] Date of Patent: Oct. 4, 1994

[54] PHOTOGRAPHIC FILM SPOOL HAVING AN ARRANGEMENT FOR RECEIVING AND HOLDING AN END OF THE FILM

[75] Inventor: Hiroshi Mitake, Kanagawa, Japan

[73] Assignee: Fuji Photo Film Co., Ltd., Minami-Ashigara, Japan

[21] Appl. No.: 21,455

[22] Filed: Feb. 23, 1993

[30] Foreign Application Priority Data

Feb. 24, 1992 [JP] Japan .................. 4-036207

[51] Int. Cl.⁵ .................................. B65H 75/28
[52] U.S. Cl. ................................... 242/584.1
[58] Field of Search ............. 242/74, 68.5, 74.1, 242/71, 71.1

[56] References Cited

U.S. PATENT DOCUMENTS 4,834,310  5/1989  Ikariya et al. ............ 242/74
4,955,555  9/1990  Pierson et al. ............ 242/74

FOREIGN PATENT DOCUMENTS 1963940   7/1970  Fed. Rep. of Germany.
4038661   6/1991  Fed. Rep. of Germany.
58-178143 11/1983 Japan.
58-203436 11/1983 Japan.
62-240957 10/1987 Japan.
834693    5/1960  United Kingdom ......... 242/74

Primary Examiner—Daniel P. Stodola
Assistant Examiner—John Q. Nguyen
Attorney, Agent, or Firm—Burns, Doane, Swecker & Mathis

[57] ABSTRACT

A photographic film spool is comprised of a spool core which includes a pair of flanges, a slot for film insertion, and a pair of walls. The walls face each other and form the slot for film insertion. One of the walls of the spool is provided with a ramp portion which is formed so as to approach the other wall gradually in the direction of film insertion, a retention hook which is provided at the top of the ramp portion and which engages an aperture of the trailing end of the photographic film, and penetrated portions which are formed on both sides of the retention hook and which penetrate the one wall in the direction perpendicular to the direction of film insertion. The other wall has a hold-down projection which inhibits the photographic film from becoming detached from the retention hook. The spool allows easy removal of the trailing end of the photographic film from the spool core without damage after use.

4 Claims, 7 Drawing Sheets

PHOTOGRAPHIC FILM SPOOL HAVING AN ARRANGEMENT FOR RECEIVING AND HOLDING AN END OF THE FILM

BACKGROUND OF THE INVENTION

This invention relates to a spool for winding a photographic film.

In the conventional photographic film spool, a slot for film insertion is formed on the spool core. A pair of hooks is provided on one of the facing walls of the slot, and a rib to inhibit slipping out of film is provided on the other wall. The rib to inhibit slipping out is disposed on the part to counter the center between the aforementioned hooks. The trailing end of the photographic film is engaged with the hooks and the rib to inhibit slipping out (Japanese Utility Model KOKAI No. 58-178143, Japanese Patent KOKAI Nos. 58-203436, 62-240957).

When photographing is finished, the photographic film engaged with the spool core is cut off near the spool, and then developed. The trailing end portion of the photographic film cut off is still engaged with the hooks and the rib to inhibit slipping out, and remains on the spool core.

Incidentally, resource saving has recently been required widely, and used spools have become recycled. In the recycling, the trailing end portion of the photographic film engaged with the spool core represents an impurity, and therefore, it must be removed.

However, in the above conventional spool, it was difficult to remove the photographic film without damage, and powder of the base resin, photographic emulsion and the like generated and contaminated the plastic produced by recycling the spool.

SUMMARY OF THE INVENTION

An object of the invention is to provide a photographic film spool capable of removing the trailing end of the photographic film from the spool core without damage.

The present invention provides a spool which has achieved the above object, having a spool core winding the photographic film thereon, a pair of flanges, which are provided on both sides in the axial direction of the spool core, restricting the movement of the photographic film in the axial direction, a slot for film insertion formed on the spool core into which the trailing end of the photographic film is inserted, and a pair of walls facing each other which form the slot for film insertion.

One of said walls has a ramp portion which is formed so as to approach the other wall gradually according to the direction of film insertion, a retention hook, which is provided around the top of the ramp portion, engaging an aperture of the trailing end of the photographic film, and penetrated portions, which are formed on both sides of the retention hook, penetrating in the direction perpendicular to the direction of film insertion.

The other of said walls has a hold-down projection which inhibits the photographic film to detach from the retention hook.

10 Photographic film spool
11 Slot for film insertion
12 Photographic film
13 Trailing end of the photographic film
14 Aperture
20 Spool core
30 Flange
40 Wall
42,53 Ramp portion (Inclined front portion)
43 Retention hook
44 Penetrated portion
50 Wall
52 Hold-down projection
P Direction of film insertion

DETAILED DESCRIPTION OF THE INVENTION

The number of a set of the ramp portion and the retention hook may be one or more. When the number is one, the penetrated portion is provided on both sides of the retention hook. When the number is two, the penetrated portion may be provided on both sides of each retention hook. Alternatively, one penetrated portion is provided between the retention hooks, and used as the penetrated portion for both retention hooks.

The penetrated portion is provided on both sides of the retention hook. However, when there are two or more retention hooks, each penetrated portion between retention hooks is used as the common penetration for both retention hooks.

The penetrated portion formed on one wall may be in various form and size capable of inserting a jig for pressing film from the outside of the spool core. For example, the penetrated portion may be a slit (in a state in which one side wall is absent), a hole (in a state in which there are all side walls), a rectangle or a circle.

A section of the hold-down projection in the insertion direction of the photographic film may be in various forms, such as a rectangle, trapezoid, triangle, semicircle or angle form, and preferred forms are gradually narrower in the insertion direction in view of the removal of the film.

In the photographic film spool of the invention, at the time the photographic film is engaged with the spool core, when the trailing end of the photographic film is inserted into the slot for film insertion, the trailing end is guided along the ramp portion or the hold-down projection of the wall to almost the center of the slot for film insertion. The trailing end is further thrusted while it is deformed by the pushing Of the retention hook onto both sides of trailing end and by the pushing of the hold-down projection onto almost the central portion in the opposite direction to each other. When the retention hook is inserted into the aperture of the trailing end, the trailing end returns in a flat form by its restitutive force. In this state, the movement of the trailing end in the inserting direction is restricted by the ramp portion and the retention hook, and the movement in the cross direction is restricted by the hold-down projection. As a result, the trailing end is fixed so as not to detach from the spool core.

Subsequently, the photographic film is detached from the spool core. For example, a jig for pressing the film is inserted into the slot for film insertion through the penetrated portions provided on both sides. The trailing end on both sides of the retention hook is pressed towards the other wall. Thereby, the aperture of the trailing end is released from engagement by the retention hook, and the trailing end is detached from the spool core without damage.

As mentioned above, since the photographic film spool of the invention has penetrated portions provided in the direction perpendicular to the direction of film insertion on both sides of the retention hook on one of the walls, the trailing end of the photographic film engaged with the spool core can be detached from the spool core without damage. As a result, recycled plastic can be produced efficiently from the spool without impurities.

EMBODIMENTS

An embodiment of the photographic film spool of the invention is illustrated in FIGS. 1 through 4. As shown in the figures, the photographic film spool 10 (hereinafter simply referred to as spool) is composed of a spool core 20, a pair of walls 40,50 which face each other and form a slot 11 for film insertion around the center of the spool core 20, and a pair of flanges 30,30 disposed near both sides of the spool core 20 in the axial direction.

Figure 1:
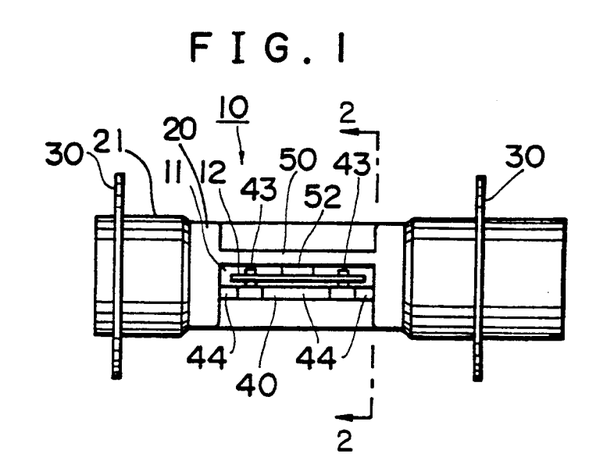
FIG. 1 is a front view of a photographic film spool embodying the invention illustrating the fixation state of the photographic film.
Figure 2:
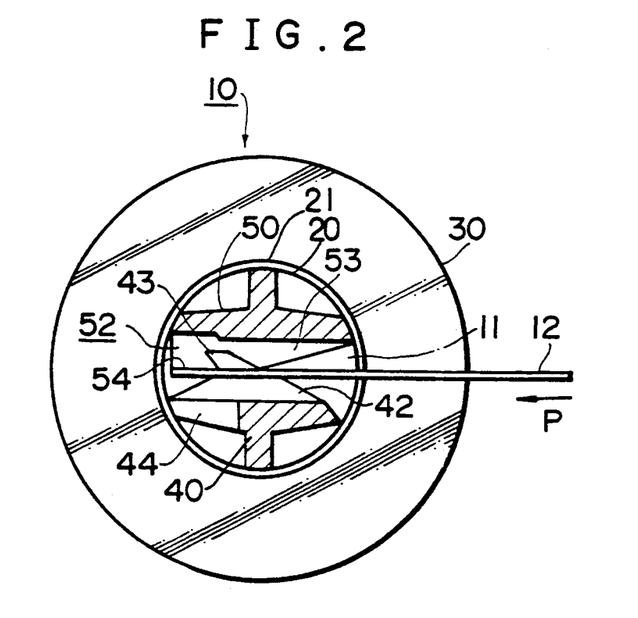
FIG. 2 is a sectional view taken along line 2—2 in FIG. 1.
Figure 3:
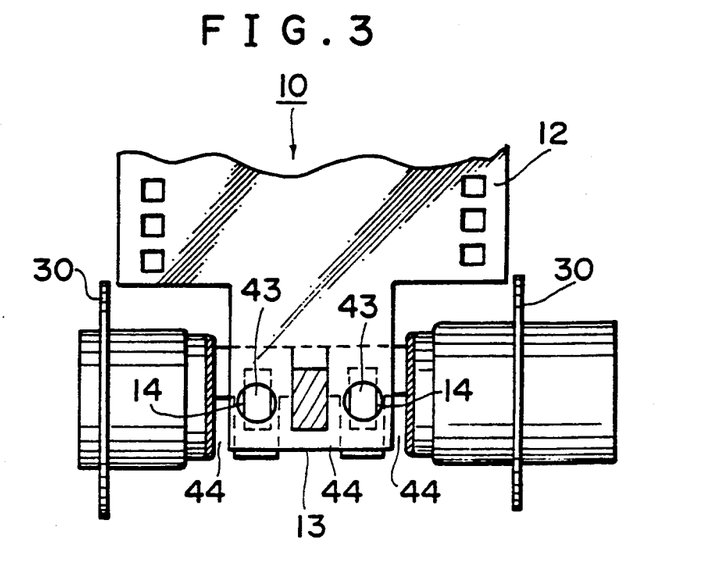
FIG. 3 is a plan view of the photographic film spool of FIG. 1 with partially cutaway.

The spool 10 has the spool core 20 with a generally cylindrical surface 21, and the photographic film 12 is wound around the periphery.

The flanges 30,30 are provided on the spool core 20 at a distance therebetween slightly longer than the width of the photographic film 12.

Near both side ends of one of the walls 40, a pair of ramp portions 42,42 are formed at the top of respective ramp portions 42,42, so as to approach the other wall 50 gradually according to the direction P of film insertion. Retention hooks 43,43 are formed for engaging the apertures 14 of the trailing end 13 of the photographic film 12. Penetrated portions 44,44,44, which penetrate in the direction perpendicular co the direction P of film insertion, are formed on the outsides of and between the retention hooks 43,43. A jig for pressing film (not illustrated) can be inserted from the outside of the spool core 20 into the penetrated portions 44,44,44. A hold-down projection 52 having a shape of rectangle in a section in the horizontal direction in the figure projects from around the center of the other wall 50. The hold-down projection 52 is provided with a ramp portion 53 that approaches the counter wall 40 gradually in the direction P of insertion of the photographic film 12 and a presser 54 following the ramp portion 53 which is almost parallel to the wall 40.

Figure 4:
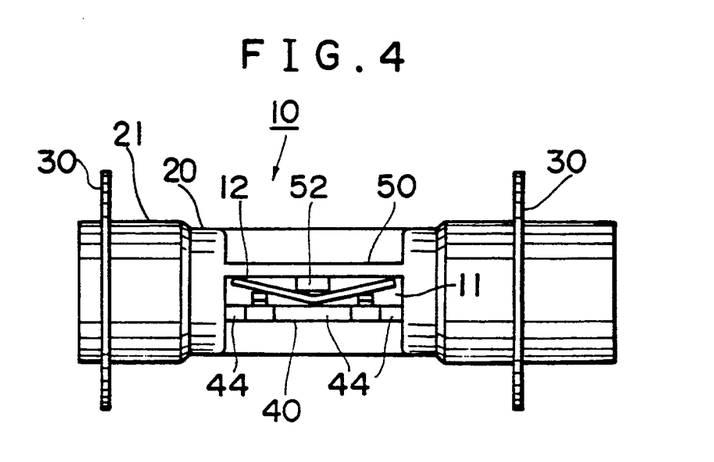
FIG. 4 is a front view of the photographic film spool of FIG. 1 illustrating the state of film insertion.
Figure 5:
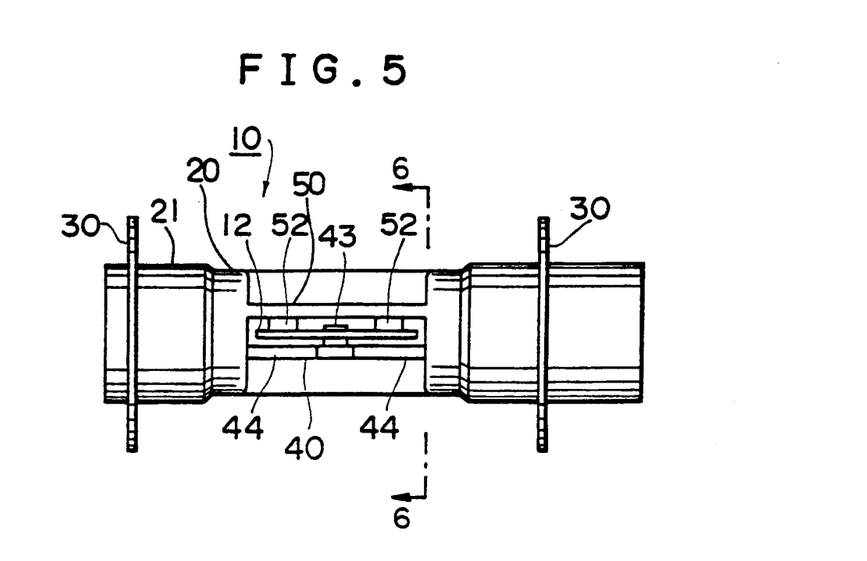
FIG. 5 is a front view of another photographic film spool also embodying the invention illustrating the fixation state of the photographic film.
Figure 6:
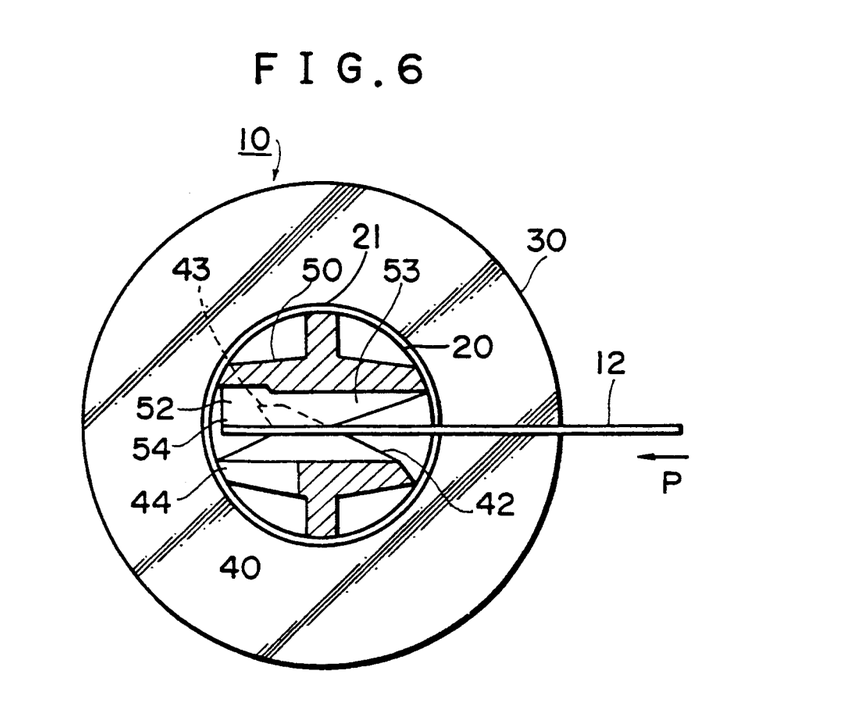
FIG. 6 is a sectional view taken along line 6—6 of in FIG. 5.
Figure 7:
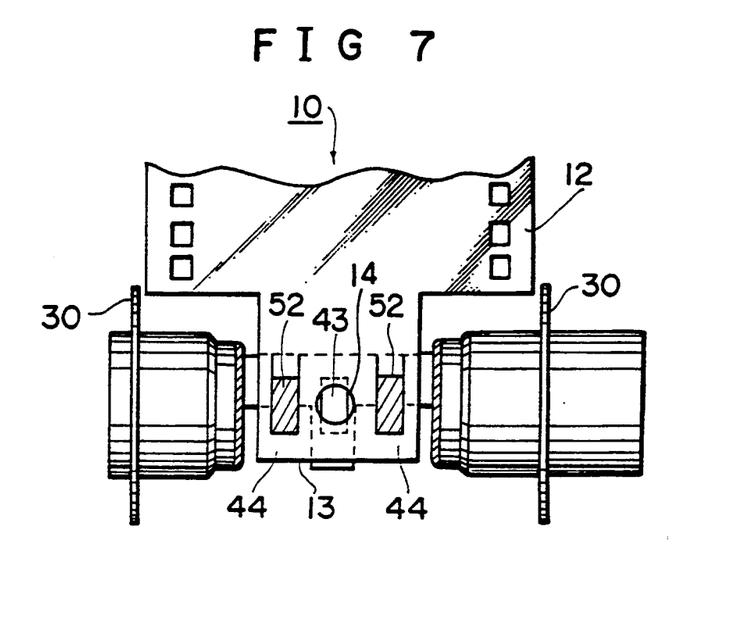
FIG. 7 is a plan view of the photographic film spool of FIG. 5 with partially cutaway.

For engaging the photographic film 12 with the spool core 20, the trailing end 13 is inserted into the slot 11 for film insertion. Then, the trailing end 13 is guided by the ramp portion 42 or 53, and as shown in FIG. 4, the trailing end 13 is further inserted while it is deformed by the retention hooks 43,43 and the presser 54. At the moment of entering the retention hooks 43,43 into the apertures 14,14 of the trailing end 13, the deformation is reformed by the restitutive force of the photographic film 12, and as shown in FIGS. 2 and 3, it becomes flat. On that occasion, the movement of the trailing end 13 is restricted by the presser 54, and the apertures 14,14 of the trailing end 13 are engaged with the retention hooks 43,43. As a result, the photographic film 12 is surely fixed to the spool core 20.

After exposure, the photographic film 12 is cut off near the spool 10, and developed. The trailing end 13 of the photographic film 12 is removed from the spool 10, and the spool 10 is recycled.

As a method of removing the trailing end 13 of the photographic film 12 from the spool core 20 prior to recycling, a jig for pressing film is inserted into the penetrated portions 44,44,44 formed on the one wall 40. Three portions of the trailing end 13 which are positioned on both sides of the retention hooks 43,43 are pressed towards the other wall 50 by the jig for pressing film. As a result, the apertures 14,14 of the trailing end 13 are released from the retention hooks 43,43, and the trailing end 13 of the photographic film 12 is detached from the spool core 20 without damage.

Since the above photographic film spool has the penetrated portions 44,44,44 formed on the outsides of and between the retention hooks 43,43 on one wall 40 in the direction perpendicular to the direction of film insertion, the trailing end 13 i not damaged by removing the trailing end 13 of the photographic film 12 that is engaged with the spool core 20. On the other hand, when the trailing end 13 of the photographic film 12 is inserted into the slot 11 for film insertion, the top of the photographic film 12 bent by the hold-down projection 52 is protruded into the penetrated portion 44. Thereby, the photographic film 12 does not contact the wall 40. Accordingly, buckling of the photographic film 12 does not occur at the top portion, and insertion resistance is decreased.

Another embodiment of the photographic film spool of the invention is illustrated in FIGS. 5 through 8. In the spool of this embodiment, the ramp portion 42 is formed at the center of one wall 40 so as to approach the other wall 50 gradually in the direction P of film insertion, and a retention hook 43 is formed at the top of the ramp portion 42. Penetrated portions 44,44, which penetrate in the direction perpendicular to the direction P of film insertion, are formed on the wall 40 on both sides of the retention hook 43. Hold-down projections 52,52 are formed near both side ends of the other wall 50. The other constructions are similar to the aforementioned spool shown in FIGS. 1 through 4.

Figure 8:
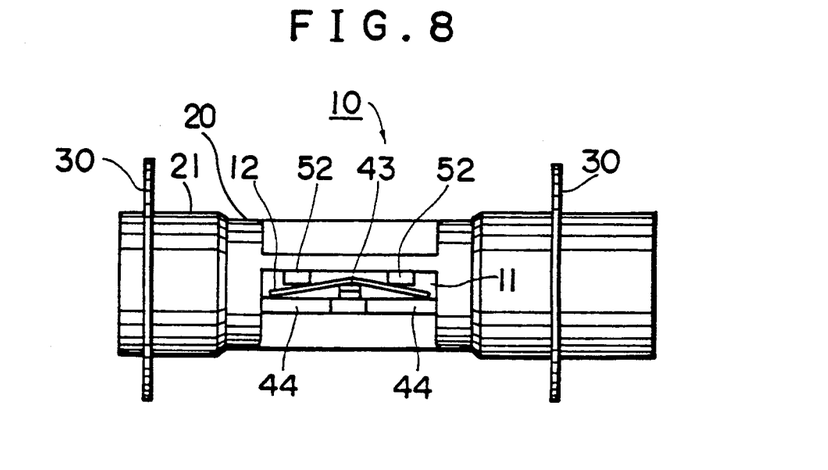
FIG. 8 is a front view of the photographic film spool of FIG. 5 illustrating the state of film insertion.
Figure 9:
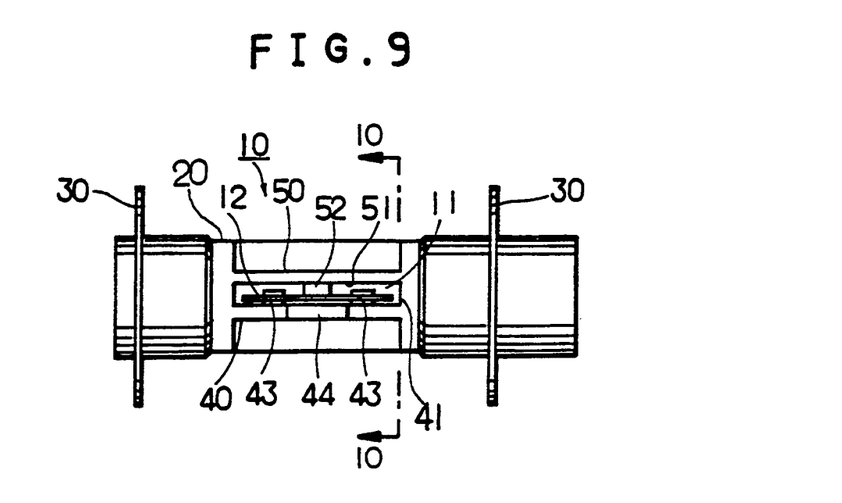
FIG. 9 is a front view of a comparative photographic film spool embodying the invention illustrating the fixation state of the photographic film.
Figure 10:
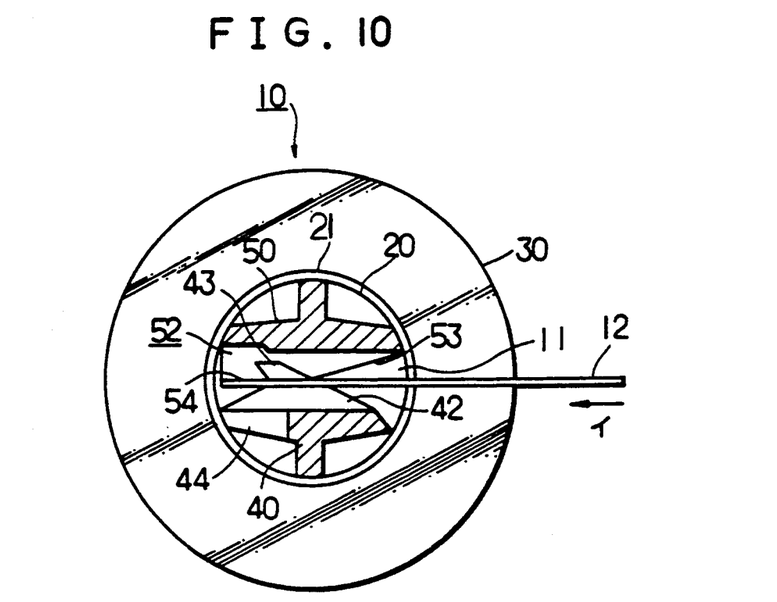
FIG. 10 is a sectional view taken along line 10—10 in FIG. 9.
Figure 11:
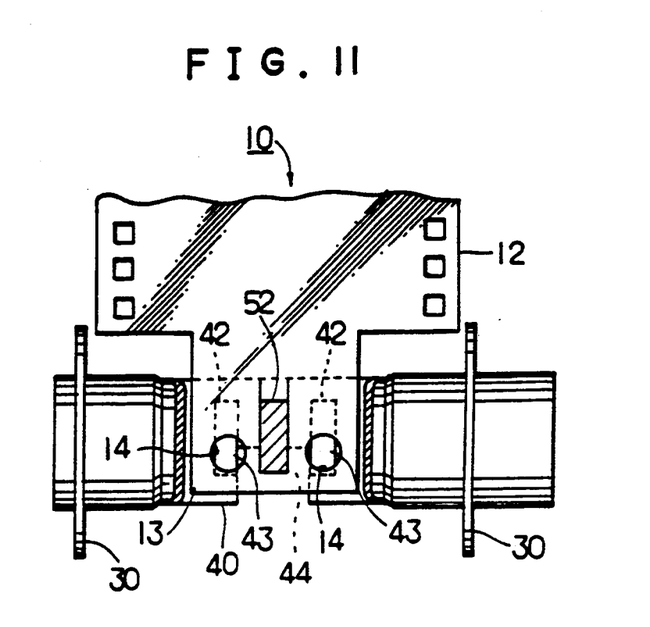
FIG. 11 is a plan view of the photographic film spool of FIG. 9 with partially cutaway.
Figure 12:
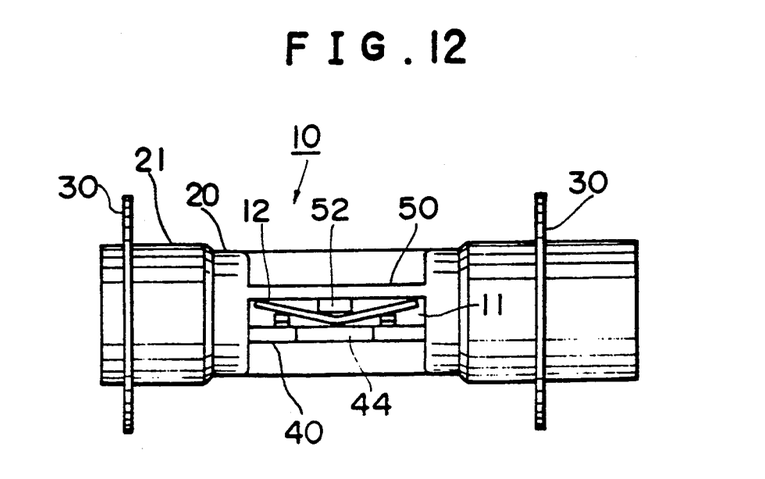
FIG. 12 is a front view of the photographic film spool of FIG. 9 illustrating the state of film insertion.

To engage the photographic film 12 with the spool tore 20, similar to the aforementioned case, the trailing end 13 is guided by the ramp portion 42,53. Then, as shown in FIG. 8, the trailing end 13 is further inserted while it is deformed by the retention hook 43 and the presser 54, and the aperture 14 of the trailing end 13 is engaged with the retention hook 43. The removal of the trailing end 13 of the photographic film 12 is carried out similar co the aforementioned case. That is, a jig for pressing film is inserted into the penetrated portions 44,44 to push up the trailing end 13 toward the wall 50, and thereby, the aperture 14 is released from the retention hook 43.

Comparative embodiments illustrated in FIGS. 9 through 12 may be similar co FIGS. 1 through 4 except that they have only one penetrated portion 44 between the retention hooks 43,43.

EXAMPLE

We prepared 50 samples of each following types of photographic film spools:

1: Conventional spool for the photographic film
2: Photographic film spool, illustrated in FIGS. 9 through 12, which has only one penetrated portion 44 between the retention hooks, 43,43
3: Photographic film spool of this invention which is illustrated in FIGS. 1 through 4

After engaging photographic film to these spools, removability of the trailing end of the photographic film from the spool core was compared.

Figure 13:
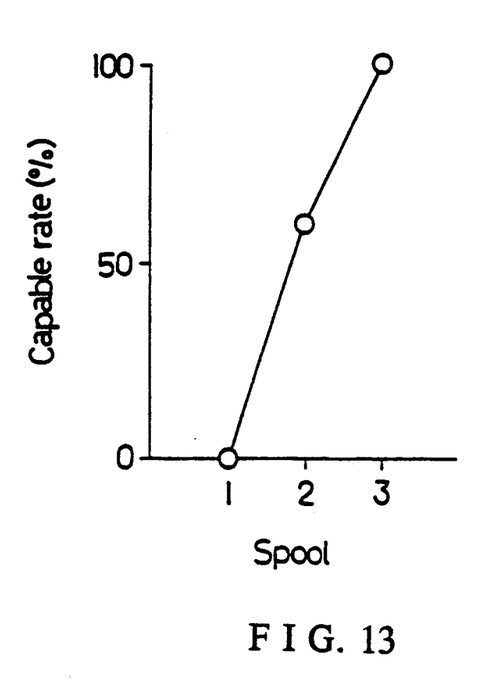
FIG. 13 is a graphical data showing the superiority of the present invention.

As a result, capable rate of removing the trailing end of the photographic film from the spool core without damage were plot on FIG. 13.

I claim:

1. A photographic film spool comprising a spool core on which is to be wound photographic film, a pair of flanges which are provided on both sides in the axial direction of the spool core for restricting the movement of the photographic film in the axial direction, a slot for film insertion formed on the spool core into which a trailing end of the photographic film is inserted, and a pair of walls facing each other which form the slot for film insertion, one of said walls having a ramp portion which gradually approaches the other wall in the direction of film insertion, a retention hook, which is provided at a part of the ramp portion spaced from the one wall and which engages an aperture in the trailing end of the photographic film, and a penetrated portion formed on each side of the retention hook and penetrating into and through said one wall in the direction perpendicular to the direction of film insertion for providing access to the trailing end of the photographic film to thereby permit removal of the trailing end of the photographic film from the spool core, and the other of said walls having a hold-down projection which inhibits the photographic film from becoming detached from the retention hook.

2. The spool of claim 1, wherein the hold-down projection has a ramp portion which gradually approaches the one wall in the direction of film insertion and a presser portion formed adjacent the ramp portion.

3. The spool of claim 1, wherein the one wall includes two retention hooks and the other wall includes a single hold-down projection.

4. The spool of claim 1, wherein the one wall includes a single retention hook and the other wall includes two hold-down projections.

* * * * *